Patented June 2, 1925.

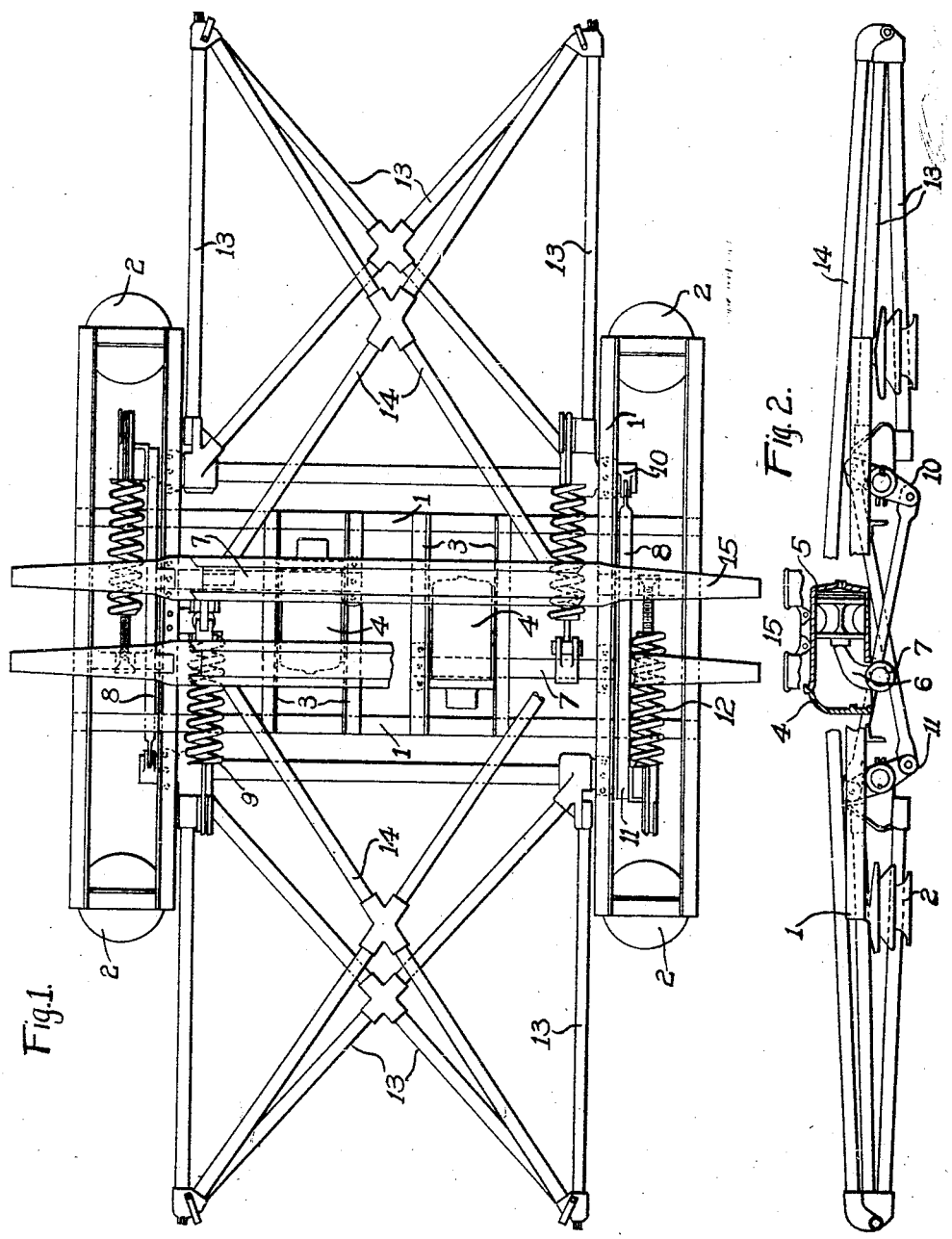

1,539,871

UNITED STATES PATENT OFFICE.

WILLIAM SCHAAKE, OF PITTSBURGH, PENNSYLVANIA, ASSIGNOR TO WESTINGHOUSE ELECTRIC & MANUFACTURING COMPANY, A CORPORATION OF PENNSYLVANIA.

PANTOGRAPH TROLLEY.

Application filed November 7, 1922. Serial No. 599,522.

*To all whom it may concern:*

Be it known that I, WILLIAM SCHAAKE, a citizen of the United States, and a resident of Pittsburgh, in the county of Allegheny and State of Pennsylvania, have invented a new and useful Improvement in Pantograph Trolleys, of which the following is a specification.

This invention relates to pantograph trolleys, more particularly to pantograph structures which are compact and occupy but little space when retracted.

Ordinarily, a pantograph trolley consists of two sets of arms pivoted to suitable supports and carrying, at their outer ends, sliding contact members or shoes to make contact with the trolley wire. The actuating mechanism therefor includes a pair of air cylinders having pistons therein operatively connected to a system of levers arranged to raise or lower the trolley structure. A plurality of sets of springs, in alinement, are so secured to the system of levers as to cause the trolley structure to retract, said springs working in opposition to the air cylinders which are adapted to raise the trolley.

The air cylinders are placed in tandem longitudinally of the trolley structure and of the car upon which the structure is mounted, or in staggered relation at diagonally opposite points relative to the center of the structure. Generally, the sets of springs are in longitudinal alinement along the sides of the structure. Such an arrangement is satisfactory for ordinary operating conditions but, under certain circumstances, it is advisable that the trolley shall be retracted to a lower position than is possible with the ordinary arrangement.

It is among the objects of this invention to provide a structure which shall be simple and compact, embodying the same elements as hitherto used, and which shall allow the pantograph structure to be retracted to a lower position.

In practising my invention, I provide a trolley structure as heretofore but rearrange the air cylinders so that the same are in alinement centrally and transversely of the trolley structure. The two sets of springs, which are used to bias the trolley to its retracted position, are placed in such staggered relation that they are out of alinement longitudinally of the trolley. This arrangement allows the entire trolley structure, including the pantograph arms and the springs, to be retracted to a plane which is lower than that possible with the old arrangement, said plane being that of the air cylinders.

In the accompanying drawing constituting a part hereof and in which like reference characters indicate like parts, Fig. 1 is a plan view of a pantograph trolley in retracted position, showing my new arrangement of the elements thereof, and Fig. 2 is a side view of the same, some parts being shown in section and others being broken away for clearness.

The base 1 of the structure, consisting of structural steel members suitably secured together, is mounted upon insulators 2 placed upon the car roof (not shown). Cross bars 3, to which air cylinders 4 are secured, constitute parts of the base 1. Pistons 5 in cylinders 4 are operatively connected to levers 6 that are pivoted on shafts 7. Members 8, mounted on shafts 7, are secured to levers 10 and 11, which are connected to pantograph arms 13 and 14, at the outer ends of which are secured contact shoes 15. Sets of springs 9 and 12, secured to levers 10 and 11, respectively, tend to bias the pantograph arms in a downward direction in opposition to pistons 5.

The general arrangement of elements described above differs from the previously used arrangement in that the air cylinders are in alinement transversely of the direction of motion of the car and of the pantograph structure mounted thereupon. When the pantograph is retracted, the arms 14 collapse to such position that they are in the same plane as the cylinders 4, the said arms being, therefore, in a lower retracted position than was possible heretofore.

The staggered arrangement of the plurality of sets of springs 9 and 12 permits the length of the structure to be materially decreased, and all of said springs are mounted in the horizontal plane of the cylinders. This also tends to decrease the height of the structure when the arms are retracted.

I claim as my invention:

1. A pantograph trolley structure comprising an extensible pantograph frame, spring means connected thereto to bias the same in one direction, a plurality of cylinders, fluid-actuated pistons therein operatively connected to said frame to effect positive movement thereof opposed to said springs, said cylinders being in alinement transversely of the direction of motion of said structure.

2. A pantograph trolley structure comprising an extensible pantograph frame, spring means connected thereto to bias the same in one direction, a plurality of cylinders, fluid-actuated pistons therein operatively connected to said frame, the positive movement thereof being opposed to said springs, said cylinders being in alinement transversely of the direction of motion of said structure, and being located centrally between the arms of said frame.

3. A pantograph trolley structure comprising an extensible pantograph frame, spring means connected thereto to bias the same in one direction, a plurality of cylinders, fluid-actuated pistons therein operatively connected to said frame, the positive movement thereof being opposed to said springs, said cylinders being in alinement transversely of the direction of motion of said structure, and being located centrally between the arms of said frame, said arms, when retracted, lying in substantially the horizontal plane of said cylinder.

4. A pantograph trolley structure comprising an extensible pantograph frame, spring means connected thereto to bias the same in one direction, a plurality of cylinders, fluid-actuated pistons therein operatively connected to said frame to provide positive movement thereof opposed to said spring means, said spring means comprising a plurality of coil springs disposed in staggered relation to one another.

5. A pantograph trolley structure comprising an extensible pantograph frame, spring means connected thereto to bias the same in one direction, a plurality of cylinders, fluid-actuated pistons therein operatively connected to said frame to provide positive movement thereof opposed to said spring means, said spring means comprising a plurality of coil springs that are longitudinally disposed relative to the longitudinal axis of said structure and staggered relative to the transverse centerline of the trolley structure.

6. A pantograph trolley structure comprising an extensible pantograph frame, spring means connected thereto to bias the same in one direction, a plurality of cylinders, fluid-actuated pistons therein operatively connected to said frame to provide positive movement thereof opposed to said spring means, said spring means comprising a plurality of relatively staggered coil springs, and said cylinders being disposed longitudinally relative to the base of said structure.

7. A pantograph trolley structure comprising an extensible pantograph frame, spring means connected thereto to bias the same in one direction, a plurality of cylinders, fluid-actuated pistons therein operatively connected to said frame to provide positive movement thereof opposed to said spring means, said spring means comprising a plurality of coil springs pivotally mounted at their respective ends and said arms and springs, being adapted to lie in substantially the horizontal plane of said cylinders, when the pantograph frame is retracted.

In testimony whereof, I have hereunto subscribed my name this 30th day of October, 1922.

WILLIAM SCHAAKE.